United States Patent
Bertini et al.

(10) Patent No.: US 8,517,339 B2
(45) Date of Patent: Aug. 27, 2013

(54) INTERFERENCE FIT ASSEMBLY, A THERMAL COMPENSATION ARRANGEMENT OF AN INJECTION VALVE AND METHOD FOR PRODUCING AN INTERFERENCE FIT ASSEMBLY

(75) Inventors: Paolo Bertini, Leghorn (IT); Alessio Di Cocco, Leghorn (IT); Fabrizio Piarulli, Bracciano RM (IT)

(73) Assignee: Continental Automotive GmbH, Hannover (DE)

( * ) Notice: Subject to any disclaimer, the term of this patent is extended or adjusted under 35 U.S.C. 154(b) by 1165 days.

(21) Appl. No.: 12/425,419

(22) Filed: Apr. 17, 2009

(65) Prior Publication Data

US 2009/0283710 A1   Nov. 19, 2009

(30) Foreign Application Priority Data

Apr. 18, 2008   (EP) .................... 08007654

(51) Int. Cl.
*F16B 4/00* (2006.01)
(52) U.S. Cl.
USPC .......................... 251/368; 403/273
(58) Field of Classification Search
USPC .......................... 403/273; 268/368
See application file for complete search history.

(56) References Cited

U.S. PATENT DOCUMENTS

| | | | |
|---|---|---|---|
| 4,047,658 A | 9/1977 | Frueauff, Jr. | |
| 6,494,918 B1 * | 12/2002 | Pope et al. .................. | 623/23.6 |
| 6,666,013 B2 | 12/2003 | Nakagawa et al. | |
| 6,715,693 B1 * | 4/2004 | Dam et al. .................. | 239/88 |
| 7,455,906 B2 | 11/2008 | Grosse et al. | |
| 7,942,343 B2 * | 5/2011 | Campion et al. .................. | 239/88 |
| 2002/0102318 A1 * | 8/2002 | Sugaya et al. .................. | 425/78 |
| 2003/0177752 A1 | 9/2003 | Nakagawa et al. | |
| 2003/0226914 A1 * | 12/2003 | Mills et al. .................. | 239/585.4 |
| 2004/0144335 A1 | 7/2004 | Grosse et al. | |
| 2006/0273319 A1 * | 12/2006 | Dairiki et al. .................. | 257/66 |
| 2007/0101797 A1 * | 5/2007 | Quan et al. .................. | 72/416 |
| 2007/0128826 A1 | 6/2007 | Chen | |
| 2007/0231482 A1 | 10/2007 | Anzinger et al. | |
| 2008/0050697 A1 * | 2/2008 | Quan et al. .................. | 433/141 |

FOREIGN PATENT DOCUMENTS

| | | |
|---|---|---|
| DE | 2726107 A1 | 12/1977 |
| EP | 1832382 A2 | 9/2007 |
| EP | 1887216 A1 | 2/2008 |
| JP | 9094911 A | 4/1997 |
| JP | 2001-225412 A  * | 8/2001 |
| JP | 2001225412 A | 8/2001 |

* cited by examiner

*Primary Examiner* — John K Fristoe, Jr.
*Assistant Examiner* — R. K. Arundale
(74) *Attorney, Agent, or Firm* — King & Spalding L.L.P.

(57) ABSTRACT

Interference fit assembly of a first metal part and a second metal part, wherein the first metal part has a recess with an inner contact surface, and the second metal part has an outer contact surface being coupled to the inner contact surface by an interference fit. At least one of the contact surfaces includes a surface layer including a diamond-like carbon. In a method for producing an interference fit assembly the surface layer is applied on at least one of the contact surfaces by a Physical Vapor Deposition or a Chemical Vapor Deposition process with the surface layer having the diamond-like carbon.

9 Claims, 2 Drawing Sheets

INTERFERENCE FIT ASSEMBLY, A THERMAL COMPENSATION ARRANGEMENT OF AN INJECTION VALVE AND METHOD FOR PRODUCING AN INTERFERENCE FIT ASSEMBLY

CROSS-REFERENCE TO RELATED APPLICATIONS

This application claims priority to European Patent Application No. EP08007654, filed Apr. 18, 2008. The complete disclosure of the above-identified application is hereby fully incorporated herein by reference.

TECHNICAL FIELD

The invention relates to an interference fit assembly, a thermal compensation arrangement of an injection valve and a method for producing an interference fit assembly.

BACKGROUND

An interference fit is a fastening between two parts by applying a force on the two parts pushing them together, with a fixed connection being established between the two parts after the application of the force has been terminated. A bond established in this manner is referred to an interference fit assembly.

The German patent application DE 27 26 107 A1 discloses an interference fit assembly made from a first metal part and a second metal part, with the first metal part comprising a recess, in which the second metal part can be accommodated. The pressure exerted on at least one of the metal parts results in a relative movement of the two metal parts to each another, thereby finally establishing a fixed connection between the two metal parts.

SUMMARY

According to various embodiments, an interference fit assembly can be created which can be easily established and contributes to a good connection between the metal parts joined in the interference fit assembly.

According to an embodiment, an interference fit assembly may comprise a first metal part and a second metal part, wherein the first metal part has a recess with an inner contact surface, and the second metal part has an outer contact surface being coupled to the inner contact surface by an interference fit, wherein at least one of the contact surfaces has a surface layer comprising a diamond-like carbon layer. According to a further embodiment, the surface layer may comprise a tungsten carbide carbon layer, wherein the tungsten carbide carbon layer is arranged between the diamond-like carbon layer and at least one of the first metal part and the second metal part. According to a further embodiment, the surface layer may comprise a chromium layer being in direct contact with at least one of the first metal part and the second metal part. According to a further embodiment, the surface layer may have a thickness of 2 to 4 micrometers.

According to another embodiment, in a thermal compensation arrangement of an injection valve, the injection valve may comprise a valve body including a central longitudinal axis, the valve body comprising a cavity, a valve needle being axially movable in the cavity, and an actuator unit being coupled to the valve needle and enabling the axial movement of the valve needle relative to the valve body, the thermal compensation arrangement comprising a casing with an inner casing cavity being designed to be coupled to the valve body and comprising a sealing element being designed to sealingly close the casing cavity and having a recess with an inner contact surface, and a piston being arranged axially movable in the casing, having a piston shaft extending axial partially through the recess of the sealing element and being designed to be coupled to the actuator unit, the piston shaft having an outer contact surface being coupled to the inner contact surface of the recess by an interference fit, wherein at least one of the contact surfaces comprises a surface layer with a diamond-like carbon layer. According to a further embodiment, the surface layer may comprise a tungsten carbide carbon layer, wherein the tungsten carbide carbon layer is arranged between the diamond-like carbon layer and at least one of the sealing element and the piston. According to a further embodiment, the surface layer may comprise a chromium layer being in direct contact with at least one of the sealing element and the piston. According to a further embodiment, the surface layer may have a thickness of 2 to 4 micrometers.

According to yet another embodiment, a method for producing an interference fit assembly, may comprise the steps: providing a first metal part having a recess with an inner contact surface, providing a second metal part having an outer contact surface, applying a surface layer on at least one of the contact surfaces by a PVD or a CVD process with the surface layer having a diamond-like carbon layer, and coupling the outer contact surface to the inner contact surface by an interference fit under a determined pressure force thereby forming the interference fit assembly of the first metal part and the second metal part.

BRIEF DESCRIPTION OF THE DRAWINGS

Exemplary embodiments are explained in the following with the aid of schematic drawings. These are as follows.

Elements of the same design and function that occur in different illustrations are identified by the same reference character.

DETAILED DESCRIPTION

Figure 1:
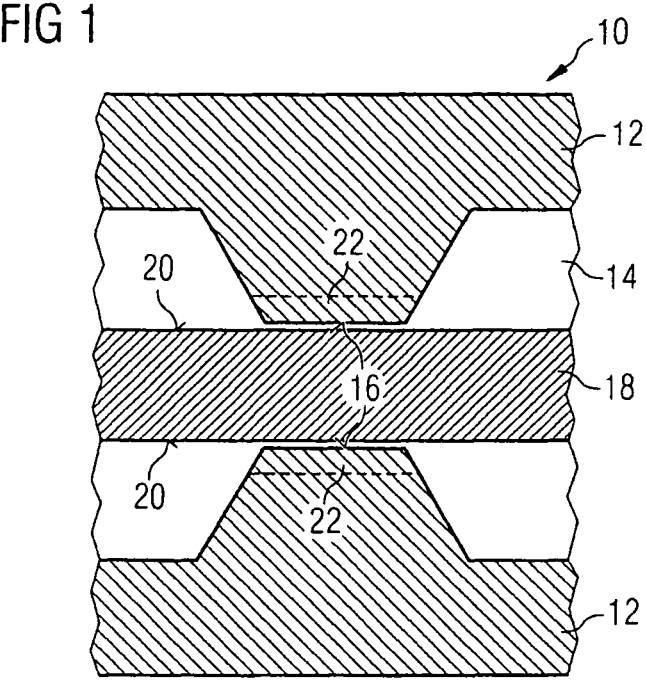
FIG. 1 a cross-section through an interference fit assembly.

According to a first aspect, the various embodiments may be distinguished by an interference fit assembly of a first metal part and a second metal part. The first metal part has a recess with an inner contact surface, the second metal part has an outer contact surface being coupled to the inner contact surface by an interference fit. At least one of the contact surfaces has a surface layer comprising a diamond-like carbon layer.

In particular, the surface layer is designed in a manner, that the contact between the inner contact surface and the outer contact surface has a minimum kinetic friction if the first metal part is not exerting a pressure on the second metal part to form the interference fit assembly.

Diamond-like carbons are occurring in different forms of amorphous carbon materials and have properties of natural diamonds. Natural diamond has in general a crystalline form of a cubic orientation with sp3-bonded carbon atoms. In contrast to this, diamond-like carbon is typically produced by processes in which the high energy precursive carbons (e.g. in plasmas, in sputter deposition and in ion beam deposition) are rapidly cooled or quenched on relatively cold surfaces. Amorphous diamond-like carbon coatings can result to have no long range crystalline order. Thus, brittle fracture planes are avoided. Therefore, such coatings are flexible and can easily match to the shape of the coated surface, and are still as hard as diamond. Diamond-like carbon coatings can be deposited at comparatively low temperatures of about 100 to 120° C.

Contact surfaces with a surface layer having a diamond-like carbon layer have the advantage that excellent tribological properties are available for the contact surfaces. As the diamond-like carbons have a low friction coefficient, no use of liquid lubricants between the metal parts is necessary. Thus, an easy insertion of the second metal part into the first metal part is possible. Thus, it is possible to avoid seizing, galling and removing of particles of one of the metal parts if the second metal part is inserted into the first metal part. The first and the second metal part can be pressed together in a known manner by applying a determined pressure at least to one of the metal parts. In particular, an equal and easily reproducible force progression can be achieved by joining the two metal parts. It is also possible to achieve very little deviations when positioning the two metal parts together.

Furthermore, a high hardness of the surface layer is available and a good adhesion of diamond-like carbons to metal parts is possible. Additionally, a subsequent welding of the interference fit assembly can be carried out.

According to an embodiment, the surface layer comprises a tungsten carbide carbon layer, wherein the tungsten carbide carbon layer is arranged between the diamond-like carbon layer and the first metal part and/or the second metal part. This has the advantage, that a good adhesion between the diamond-like carbon layers and the metal parts is possible, in particular if the metal of the metal part comprises a steel.

In a further embodiment the surface layer comprises a chromium layer being in direct contact with the first metal part and/or the second metal part.

This has the advantageous that the chromium layer can have the function of a glue layer for a very good adhesion between the metal part and the tungsten carbide carbon layer and/or the diamond-like carbon layer, in particular if the metal of the metal parts comprises a chromium steel.

In a further embodiment the surface layer has a thickness of 2 to 4 μm. This is advantageous in that only a low influence is exerted on the geometry of the metal parts. Furthermore, it is possible that only a low demand of material is required for the layer and thus results in low costs.

According to a second aspect, the various embodiments may be distinguished by a thermal compensation arrangement of an injection valve, the injection valve comprising a valve body including a central longitudinal axis, the valve body comprising a cavity, a valve needle being axially moveable in the cavity, and an actuator unit being coupled to the valve needle and enabling the axial movement of the valve needle relative to the valve body, the thermal compensation arrangement comprising a casing with an inner casing cavity being designed to be coupled to the valve body and comprising a sealing element being designed to sealingly close the casing cavity and having a recess with an inner contact surface, and a piston being arranged axially moveable in the casing. The piston has a piston shaft extending partially through the recess of the sealing element and being designed to be coupled to the actuator unit. The piston shaft has an outer contact surface being coupled to the inner contact surface of the recess by an interference fit. At least one of the contact surfaces comprises a surface layer with a diamond-like carbon layer.

This has the advantage, that at least one of the contact surfaces of the sealing element and the piston shaft with a surface layer having a diamond-like carbon layer has very good tribological properties. With the low friction coefficient of the diamond-like carbons the use of liquid lubricants between the piston shaft and the sealing element is not necessary. Thus, the piston shaft can be inserted easily into the sealing element. Seizing, galling and removing of particles of one of the piston shaft and the sealing element can be avoided if the piston shaft is inserted into the sealing element. The piston shaft and the sealing element can be pressed together by applying a determined pressure to at least one of the piston shaft and the sealing element. In particular, an equal and easily reproducible force progression can be achieved by joining the piston shaft and the sealing element. It is also possible to achieve very little deviations when positioning the piston shaft and the sealing element together.

Additionally, a high hardness of the surface layer and a good adhesion of diamond-like carbons to the piston shaft and the sealing element is possible.

Summarizing the above, it is possible to use the known materials for the piston shaft and the sealing element and applying the surface layer with the diamond-like carbons on the piston shaft and the sealing element to avoid seizing, galling and removing of particles of one of the piston shaft and the sealing element. Consequently, a cost intensive development for a change of the materials of the piston shaft and the sealing element can be avoided.

Furthermore, an easy welding of the piston shaft and/or the sealing element after the assembly process is possible to improve the coupling between the piston shaft and the sealing element. Additionally, a contamination of the casing cavity from the welding process due to overheated liquid lubricates can be avoided, as liquid lubricants are not necessary.

In an embodiment according to the second aspect, the surface layer comprises a tungsten carbide carbon layer, wherein the tungsten carbide carbon layer is arranged between the diamond-like carbon layer and the sealing element and/or the piston.

This has the advantage that a good adhesion between the diamond-like carbon layers and the sealing element and/or the piston is possible, in particular if the metal of the sealing element and/or the piston shaft comprises steel.

In a further embodiment according to the second aspect the surface layer comprises a chromium layer being in direct contact with the sealing element and/or the piston. The chromium layer can have the function of a glue layer for a very good adhesion between the sealing element or the piston and the tungsten carbide carbon layer or the diamond-like carbon layer, in particular if the metal of the sealing element and/or the piston comprises a chromium steel.

In a further embodiment according to the second aspect the surface layer has a thickness of 2 to 4 μm. By this, only little influence on the geometry of the sealing element and/or the piston can be exerted. Furthermore, it is possible that only a small demand is required for the surface layer and thus results in low costs.

A third aspect of the various embodiments is distinguished by a method for producing an interference fit assembly, with the steps: providing a first metal part having a recess with an inner contact surface, providing a second part having an outer contact surface, applying a surface layer on at least one of the contact surfaces by a Physical Vapor Deposition (PVD) or a Chemical Vapor Deposition (CVD) process with the surface layer having a diamond-like carbon layer, and coupling the outer contact surface to the inner contact surface by an interference fit under a determined pressure force thereby forming the interference fit assembly of the first metal part and the second metal part.

FIG. 1 shows a schematic view of a cross-section through an interference fit assembly 10. The interference fit assembly 10 comprises a first metal part 12 and a second metal part 18. The first metal part 12 has a recess 14, in which the second metal part 18 is arranged. The first metal part 12 has an inner contact surface 16 and the second metal part 18 has an outer contact surface 20. The inner contact surface 16 of the first metal part 12 is in contact with the outer contact surface 20 of the second metal part 18.

Figure 2:
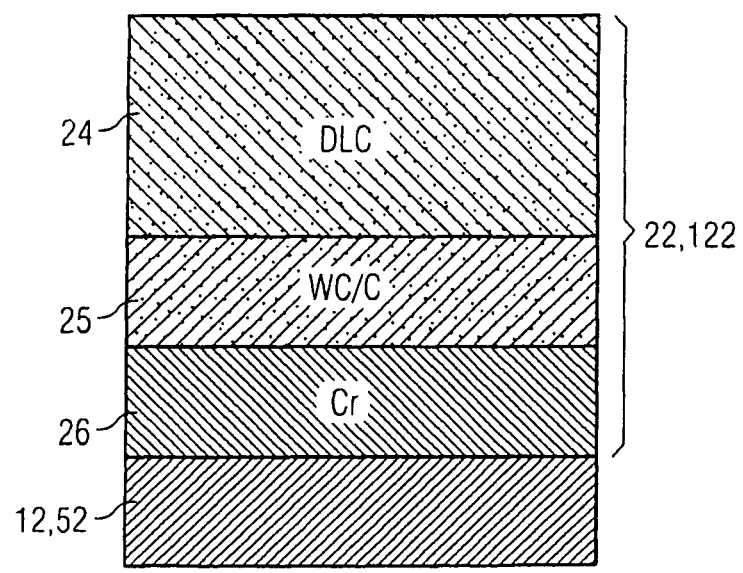
FIG. 2 a detailed view of a surface layer of the interference fit assembly in a cross-section view, and FIG. 3 a longitudinal section through an injection valve with the interference fit assembly.

The inner contact surface 16 of the first metal part 12 comprises a surface layer 22. The surface layer 22 is formed from a material comprising a diamond-like carbon layer 24 (FIG. 2). By applying a surface layer 22 to a diamond-like carbon layer 24, the slip resistance between the metal parts 12, 18 is significantly reduced.

It may be particularly advantageous if the surface layer 22 further comprises a tungsten carbide carbon layer 25 (FIG. 2). The tungsten carbide carbon layer 25 is arranged between the diamond-like carbon layer 24 and the first metal parts 12. If the tungsten carbide carbon layer 25 is arranged between the diamond-like carbon layer 24 and the first metal part 12 a good adhesion between the diamond-like carbon layer 24 and the first metal part 12 is possible. The tungsten carbide carbon layer 25 acts as an intermediate layer to bond the diamond-like carbon layer 24 to the metal parts 12.

The surface layer 22 further comprises a chromium layer 26 which is in direct contact with the first metal part 12 (FIG. 2). The chromium layer 26 acts as a glue layer for a good adhesion between the first metal part 12 and the tungsten carbide carbon layer 25 and/or the diamond-like carbon layer 25, in particular if the metal of the first metal part 12 comprises a chromium steel. The chromium layer 26 enables a very good bonding between the chromium in the chromium steel of the first metal part 12 and the tungsten carbide carbon layer 25.

In an alternative embodiment, instead of the inner contact surface 16 of the first metal part 12 the outer contact surface 20 of the second metal part 18 comprises the surface layer 22 with the diamond-like carbon layer 24, the tungsten carbide carbon layer 25, and the chromium layer 26. In a further alternative embodiment, both the inner contact surface 16 of the first metal part 12 and the outer contact surface 20 of the second metal part 18 comprise the surface layer 22 with the diamond-like carbon layer 24, the tungsten carbide carbon layer 25, and the chromium layer 26.

The first metal part 12 and the second metal part 18 are preferably made of steel. The surface layer 22 with the diamond-like carbon layer 24 provides good gliding properties of the corresponding metal parts 12, 18. If the surface layer 22 has a thickness of 2 to 4 µm, only a minimum demand of material, in particular of diamond-like carbon for the diamond-like carbon layer 24 and tungsten carbide carbon is necessary. Furthermore, the little thickness of the surface layer 22 exerts only a very small influence on the geometry of the metal parts 12, 18.

In the following the method for producing an interference fit assembly 10 will be described in detail:

The first metal part 12 with the recess 14 and the inner contact surface 16 is provided. The surface layer 22 is applied on at least one of the contact surfaces 16, 20 by a Physical Vapor Deposition (PVD) or a Chemical Vapor Deposition (CVD) process. With the surface layer 22 comprising a diamond-like carbon layer 24, a PVD or a CVD process is preferred as these processes enable to provide very low thicknesses of about 2 to 4 µm of the surface layer 22. The second metal part 18 is now introduced into the first metal part 12. The risk of removing particles from the first metal part 12 and/or from the second metal part 18 is small as a result of the good gliding properties between the two metal parts 12, 18. Thereby, a good guiding of the second metal part 18 into the first metal part 12 is enabled in an efficient manner. The risk of seizing and galling can be avoided when the second metal part 18 is inserted into the first metal part 12. By inserting the second metal part 18 into the first metal part 12 the outer contact surface 20 comes into contact with the inner contact surface 16 under a determined pressure force. Thereby the interference fit assembly 10 of the first metal part 12 and the second metal part 18 is formed in a known manner.

Figure 3:
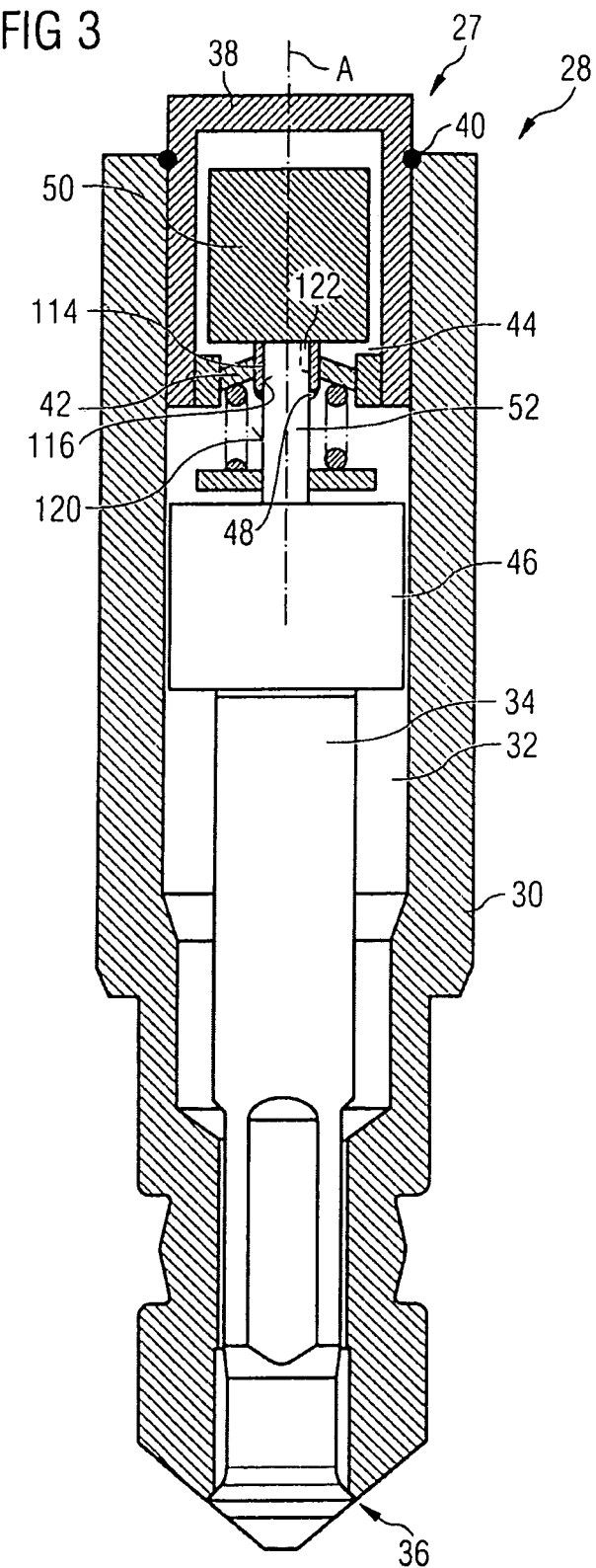

FIG. 3 shows an injection valve 27 that is used as a fuel injection valve for an internal combustion engine.

The injection valve 27 comprises a valve body 30 having a cavity 32. The cavity 32 is axially laid through the valve body 30 with a central longitudinal axis A. A valve needle 34 is arranged in the cavity 32 of the valve body 30. The valve needle 34 is guided partially by the valve body 30. On one of the free ends of the cavity 32 an injection nozzle 36 is formed which is closed or opened depending on the axial position of the valve needle 34. By this fuel can be introduced into a combustion chamber of an internal combustion engine of a motor vehicle assigned to the injection valve 27. The valve needle 34 is pre-tensioned by means of a spring such that it prevents fluid from flowing through the injection nozzle 36 if no further forces are applied to the valve needle 34. The cavity 32 of the valve body 30 is designed to be connected to a high pressure fuel chamber of the internal combustion engine, the fuel is stored under high pressure, for example under the pressure of above 200 Bar.

The injection valve 27 is of an outward opening type. In an alternative embodiment the injection valve 27 may be of an inward opening type.

The injection valve 27 has a actuator unit 46 which is arranged in the housing valve body 30 and comprises a piezo actuator, which changes its axial length depending on a control signal applied to it. The actuator unit 46 may, however, also comprise another type of actuator, which is known to person skilled in the art for that purpose. Such an actuator may be, for example, a solenoid.

The injection valve comprises a thermal compensation arrangement 28 and is coupled to the actuator unit 46. The thermal compensation arrangement 28 has a casing 38 of a cylindrical shape. The thermal compensation arrangement 28 is rigidly coupled to the valve body 30 by a first welding seam 40.

The casing 38 has a casing cavity 44 in which a piston 50 is arranged which has a cylindrical shape and extends in the axial direction of the casing 38 and is coupled to the actuator unit 46 by a piston shaft 52.

The thermal compensation arrangement 28 comprises a sealing element 42 arranged in a piston rest which is part of the casing 38 and can support the piston 50.

The sealing element 42 is designed to sealingly close the casing cavity 44 and has a recess 114 with an inner contact surface 116. The piston shaft 52 of the piston 50 has an outer contact surface 120 which is coupled with the inner contact surface 116 of the recess 114 by an interference fit. The outer contact surface 120 comprises a surface layer 122 which is extending in axial direction in an axially limited area which is in contact with the inner contact surface 116 of the recess 114. The surface layer 122 of the outer contact surface 120 of the piston shaft 52 comprises the diamond-like carbon layer 24, the tungsten carbide carbon layer 25 and the chromium layer 26 as described above (FIG. 2).

To improve the sealing and the mechanical stability between the piston shaft 52 and the sealing element 42 a second welding seam 48 is arranged on the outer contact surface 120 of the piston shaft 52 at an axial end of the sealing element 42 facing the injection nozzle 36. As the outer contact surface 120 of the piston shaft 52 at the axial end of the sealing element 42 facing the injection nozzle 36 does not carry the surface layer 122 good welding conditions between the piston shaft 52 and the sealing element 42 for applying the second welding seam 48 are available.

In the following the assembly process of the thermal compensation arrangement 28 will be described in detail.

The piston 50 and the sealing element 42 are provided. The surface layer 122 is applied on at least one of the contact surfaces 116, 120 by a PVD or a CVD process. Preferably, the surface layer 122 is arranged on the contact surface 120 of the piston shaft 52. The surface layer 120 comprises the diamond-like carbon layer 24. Then the piston shaft 52 is shifted into the recess 114 of the sealing element 42, thus bringing the outer contact surface 120 into contact with the inner contact surface 116. A pressure force is applied on the piston shaft 52 to form the interference fit assembly 10 between the piston shaft 52 and the sealing element 42. During the assembly of the interference fit assembly 10, the piston shaft 52 can easily be moved into the sealing element 42 with a minimum kinetic friction and can be designed with the sealing element 42 to form the interference fit assembly by exerting the pressure on the piston shaft 52.

The second welding seam 48 is arranged on the axial end of the sealing element 42 facing the injection nozzle 36. The second welding seam 48 enables the coupling between the piston 50 and the sealing element 42 to be improved. A soldered seam can also be configured instead of the second welding seam 48.

What is claimed is:

1. An interference fit assembly comprising: a first metal part; and a second metal part, wherein the first metal part has a recess with an inner contact surface, and the second metal part has an outer contact surface being coupled to the inner contact surface by an interference fit, wherein at least one of the contact surfaces has: a surface layer comprising a diamond-like carbon layer; a first subsurface layer comprising a tungsten carbide carbon layer between the diamond-like carbon surface layer and the respective metal part; and a second subsurface layer comprising a chromium layer in direct contact with the respective metal part, such that the tungsten carbide carbon layer is arranged between the chromium layer and the diamond-like carbon surface layer; wherein a thickness of the chromium layer extends from a third surface in contact with the metal part to a fourth surface in contact with the tungsten carbide carbon layer, and wherein the chromium layer has a constant composition across the thickness of the chromium layer; and wherein a thickness of the tungsten carbide carbon layer extends from a first surface in contact with the chromium layer to a second surface in contact with the diamond-like carbon surface layer, and wherein the tungsten carbide carbon layer has a constant composition across the thickness of the tungsten carbide carbon layer, wherein the constant composition across the thickness of the tungsten carbide carbon layer is different than the constant composition across the thickness of the chromium layer.

2. The interference fit assembly according to claim 1, wherein the surface layer has a thickness of 2 to 4 micrometers.

3. The interference fit assembly according to claim 1, wherein the metal part associated with the at least one of the contact surfaces comprises a steel.

4. An interference fit assembly comprising: a first metal part; and a second metal part, wherein the first metal part has a recess with an inner contact surface, and the second metal part has an outer contact surface being coupled to the inner contact surface by an interference fit, wherein at least one of the contact surfaces has: a chromium layer covering and in direct contact with the respective metal part; a tungsten carbide carbon layer covering and in direct contact with the chromium layer; and a diamond-like carbon surface layer covering the tungsten carbide carbon layer; such that the chromium layer is arranged between the respective metal part and the tungsten carbide carbon layer, and the tungsten carbide carbon layer is arranged between the chromium layer and the diamond-like carbon surface layer; wherein a thickness of the chromium layer extends from a first surface in contact with the metal part to a second surface in contact with the tungsten carbide carbon layer, and wherein the chromium layer has a constant composition across the thickness of the chromium layer; and wherein a thickness of the tungsten carbide carbon layer extends from a third surface in contact with the chromium layer to a fourth surface in contact with the diamond-like carbon surface layer, and wherein the tungsten carbide carbon layer has a constant composition across the thickness of the tungsten carbide carbon layer, wherein the constant composition across the thickness of the tungsten carbide carbon layer is different than the constant composition across the thickness of the chromium layer.

5. The interference fit assembly according to claim 4, wherein the diamond-like carbon surface layer has a thickness of 2 to 4 micrometers.

6. The interference fit assembly according to claim 4, wherein the metal part associated with the at least one of the contact surfaces comprises a steel.

7. An interference fit assembly comprising: a first metal part; and a second metal part, wherein the first metal part has a recess with an inner contact surface, and the second metal part has an outer contact surface being coupled to the inner contact surface by an interference fit, wherein at least one of the contact surfaces has: a chromium layer covering and in direct contact with the respective metal part; a tungsten carbide carbon layer covering and in direct contact with the chromium layer; and a diamond-like carbon surface layer covering the tungsten carbide carbon layer; such that the chromium layer is arranged between the respective metal part and the tungsten carbide carbon layer, and the tungsten carbide carbon layer is arranged between the chromium layer and the diamond-like carbon surface layer; wherein the chromium layer is free of tungsten carbide; and wherein the tungsten carbide carbon layer is free of chromium.

8. The interference fit assembly according to claim 7, wherein the diamond-like carbon surface layer has a thickness of 2 to 4 micrometers.

9. The interference fit assembly according to claim 7, wherein the metal part associated with the at least one of the contact surfaces comprises a steel.

* * * * *